(12) United States Patent
Wachter et al.

(10) Patent No.: US 7,867,937 B2
(45) Date of Patent: Jan. 11, 2011

(54) DRYING DEVICE FOR PRODUCING SMALL QUANTITIES OF CONTROLLED PARTICLE SIZE CATALYSTS WHICH ARE APPROPRIATE FOR USE IN FLUIDIZED BED OPERATIONS SUCH AS FLUID CATALYTIC CRACKING

(75) Inventors: William A. Wachter, Flemington, NJ (US); Jeffrey T. Elks, Geneva, IL (US); Brenda A. Raich, Annandale, NJ (US); Theodore E. Datz, Easton, PA (US); Mary T. Van Nostrand, Clinton, NJ (US); Gordon F. Stuntz, Hellertown, PA (US); David O. Marler, Easton, PA (US); Nicholas Rollman, Slatington, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 417 days.

(21) Appl. No.: 12/001,361

(22) Filed: Dec. 11, 2007

(65) Prior Publication Data

US 2008/0146435 A1 Jun. 19, 2008

Related U.S. Application Data

(60) Provisional application No. 60/875,198, filed on Dec. 15, 2006.

(51) Int. Cl.
*B01J 35/02* (2006.01)
(52) U.S. Cl. ...................................... 502/60
(58) Field of Classification Search ........................ None
See application file for complete search history.

(56) References Cited

U.S. PATENT DOCUMENTS 2,003,021 A 5/1935 Sullivan
4,416,800 A 11/1983 Abe et al.

(Continued)

FOREIGN PATENT DOCUMENTS

DE 282149 A5 7/1991

(Continued)

OTHER PUBLICATIONS

Wang, X., et al., "Fabrication of Micro-Reactors using Tape-Casting Methods", Catalysis Letters (2001), 77(4), 173-177.

(Continued)

*Primary Examiner*—Melvin C Mayes
*Assistant Examiner*—Stefanie Cohen
(74) *Attorney, Agent, or Firm*—David M. Weisberg

(57) ABSTRACT

Catalysts for experimentation are produced having a controlled matrix pore structure. The manufacturing process utilizes tape casting in the drying procedure in which a catalyst slurry is cast on a substrate and dried at a temperature of between about 50° C. to 200° C. for a period of time of about 0.1 to 1.0 hour. The dried catalyst particles can be removed from the substrate by several techniques, including scraping, burning, and deforming the substrate material. The resulting catalytic particles can be produced in an amount of about ca. 3 g to 300 g from slurries with volumes between 5 cc to 500 cc, which are suitable for small scale FCC reactors and for high throughput experimentation.

11 Claims, 2 Drawing Sheets

U.S. PATENT DOCUMENTS

| | | | |
|---|---|---|---|
| 4,699,893 A | | 10/1987 | Andrews et al. |
| 5,346,875 A | * | 9/1994 | Wachter et al. ............. 502/233 |
| 5,426,864 A | * | 6/1995 | Svehaug et al. ................ 34/70 |
| 5,500,199 A | | 3/1996 | Bellussi et al. |
| 6,395,552 B1 | | 5/2002 | Borade et al. |
| 6,451,730 B1 | | 9/2002 | Friedrich et al. |
| 6,534,033 B1 | | 3/2003 | Amendola et al. |
| 2003/0219906 A1 | | 11/2003 | Giaquinta et al. |
| 2005/0201916 A1 | | 9/2005 | Yavuz et al. |
| 2006/0135809 A1 | * | 6/2006 | Kimmich et al. ............ 560/241 |
| 2007/0099797 A1 | * | 5/2007 | Hu et al. ..................... 502/319 |

FOREIGN PATENT DOCUMENTS

| | | |
|---|---|---|
| DE | 292149 | 7/1991 |
| DE | 19805719 | 8/1999 |
| DE | 19805719 A1 | 8/1999 |
| GB | 2417921 A | 3/2006 |
| JP | 4071642 | 3/1992 |
| JP | 3066044 | 7/2000 |
| JP | 2003135977 | 5/2003 |
| JP | 2004-307311 | 11/2004 |
| JP | 2004307311 | 11/2004 |
| WO | WO 99/41005 | 8/1999 |
| WO | WO9941005 | 8/1999 |
| WO | WO 2005/016513 A1 | 2/2005 |
| WO | WO 2005016513 | 2/2005 |
| WO | WO 2006027593 A2 | 3/2006 |

OTHER PUBLICATIONS

Kimball, G., "Direct vs. Indirect Drying: Optimizing the Process", Chemical Engineering, 108/5 74-81 (May 2001).

Ge, Shifu et al., "Drying Mechanism of Thin Film Coated on Particle Surface", Huagong Xuebao/Journal of Chemical Industry and Engineering (China) v56, n1, Jan. 2005.

Lebedev, V. Ya, et al., "Combined Drying of a Granulated Material in a Fluidized-Bed Apparatus", J. Appl. Chem. (USSR), v60, n7, pt1, Jul. 1987 pp. 1450-1454.

Ma, H., et al., "Nano-Corundum—Synthesis and Use as Filtration Membranes, Catalyst Carriers, Wear Resistant Coatings and Sensors", Chemical Engineering and Technology, 24/10, 1005-1008 (Oct. 2001).

Maier, Wilhelm F., "Combinatorial Catalyst Libraries: Preparation, Characterization, and Catalysis", Book of Abstracts, 219th ACS National Meeting, San Francisco, CA, Mar. 26-30, 2000, MTLS-002 (Publisher: American Chemical Society, Washington, D.C.).

Wang, X., et al, "Fabrication of micro-reactors using tape-casting methods", Catalysis Letters (2001), 77(4), 173-177 Coden.—Abstract attached.

Kimball, G. "Direct vs indirect drying: Optimizing the process" Chemical Engineering 108/5 74-81 (May 2001)—Abstract attached.

Ge, S., et al. "Drying mechanism of thin film coated on particle surface" Huagong Xuebac/Journal of Chemical Industry and Engineering (China) v 56 n 1 Jan. 2005, p. 30-34 CODEN:—abstract attached.

Lebedev, V.Ya, et al., "Combined Drying of a Granulated Material in a Fluidized Bed Apparatus" J. Appl Chem USSR v 60 n 7 pt 1 Jul. 1987, p. 1450-1454 CODEN—abstract attached.

Ma, H., et al., "Nano-corundum—Synthesis and use as filtration membranes, catalyst carriers, wear resistant coatings and sensors", Chemical Engineering and Technology 24/10 1005-1008 (Oct. 2001)—Abstract attached.

Maier, W.F., Combinatorial catalyst libraries: Preparation, characterization, and catalysis, Book of Abstracts, 219th ACS Nat'l Meeting, San Francisco, CA., Mar. 26-30, 2000—Abstract attached.

* cited by examiner

DRYING DEVICE FOR PRODUCING SMALL QUANTITIES OF CONTROLLED PARTICLE SIZE CATALYSTS WHICH ARE APPROPRIATE FOR USE IN FLUIDIZED BED OPERATIONS SUCH AS FLUID CATALYTIC CRACKING

This application claims the benefit of U.S. Provisional Application No. 60/875,198 filed Dec. 15, 2006.

BACKGROUND OF THE INVENTION

1. Field of the Invention

This invention relates to catalysts, particularly catalysts for use in fluidized bed operations. More specifically, this invention relates to the manufacture of catalysts, especially fluid catalytic cracking catalysts, and catalyst samples used in experimentation.

2. Discussion of Related Art

Fluid catalytic cracking (FCC) is a known process that cracks heavy gas oils into diesel oils and gasoline with the use of catalysts that speed up the cracking reaction. FCC uses catalysts with an ultimate particle size on the order of about 20-120 microns. The cracking process operates at temperatures of between about 450° C. and 650° C. and at contact times on the order of about 1-60 seconds. With such short contact times and high temperatures, a critical requirement for effective catalyst performance is the absence of diffusional limitations on the reaction rate. To achieve this, the size and connectivity of the pores in the catalyst must be carefully controlled.

The typical FCC catalyst is comprised of zeolites, which have an ultimate pore diameter of less than 8 Angstroms; aluminas, which have an ultimate pore diameter above 20 Angstroms; leached clays, which have an ultimate pore diameter around 45-65 Angstroms; clays, which have little porosity in their native state but which can be pillared to have ultimate pore widths of ca. 10-30 Angstroms; and, binders. The binders can include silica sols with ultimate particle sizes of around 20 Angstroms, aluminum chlorhydrol with an ultimate particle size of ca. 10 Angstroms, and peptized alumina with an ultimate particle size of ca. 30 Angstroms. The binders can create porosity by the manner in which they bind together the larger components in the slurry upon drying. For example if the binder sols react first with each other and then with the larger components, they tend to "gel." Gels are intrinsically viscous, and require significant dilution before their viscosity is low enough to allow spray drying. Control of the pore size distributions in gels is poorer than in sol systems.

One method of choice for preparing large quantities of microspheroids of the particle size that can be used as catalysts in FCC is spray drying. However, spray drying is not the choice for the preparation of small quantities of catalysts, especially small quantities of catalysts suitable for application in high throughput experimentation (HTE). HTE is a useful tool for increasing the rate of experimentation and improving and accelerating the possibility of making discoveries of new products and processes. It would be beneficial to use HTE techniques to experiment on process variables and the composition of catalysts used in refining operations, particularly in FCC.

The amount of material suitable for HTE (about 50 g), if run in a scaled down spray drier, would either stick to the walls or have ultimate particle sizes that are too low because the drying time (free fall time in the spray drier) would be too short. Since slow diffusion of gas oil molecules can limit the extent of their reaction, it is critical that any catalyst made for HTE has the same ultimate particle size as a commercially prepared catalyst. It is also critical that the drying procedure (e.g., slurry density, viscosity, and time-temperature-gas composition distribution in the drier) has the potential to recreate the controlling variables for the pore size distribution in the spray drier operation.

Thus, there is a need for a method of manufacturing small quantities of controlled particle size catalysts, particularly catalysts used in fluidized bed operations such as FCC, for high throughput experimentation and a device for practicing the method. There is also a need for manufacturing small quantities of particles having a size and pore distribution that is equivalent to commercially produced particles.

BRIEF SUMMARY OF THE INVENTION

Aspects of embodiments of the invention relate to providing a device for the manufacture of small amounts of catalyst particles whose size and pore size distribution is equivalent to that produced in commercial operations.

Another aspect of embodiments of the invention relates to providing a method for manufacturing small quantities of FCC catalyst particles having a size and pore size distribution suitable for high throughput experimentation.

This invention is directed to a process for producing a fluid catalytic cracking catalyst sample, comprising a process for producing a fluid catalytic cracking catalyst sample comprising casting a catalyst slurry onto a driven substrate, drying the cast catalyst slurry on the substrate at temperatures between 50° C. to 200° C. for a period of time of about 0.1 hour to 1.0 hour to obtain dried catalyst particles, and removing the dried catalyst particles from the substrate.

After the catalyst particles are dried, the process can further comprise calcining the dried catalyst at temperatures between 400° C. to 800° C. for 1 hour and steaming the calcined catalyst at temperatures between 760° C. to 830° C. for a period of between 6 hours and 16 hours.

The invention is also directed to a fluid catalytic cracking catalyst sample produced by the process of casting a catalyst slurry onto a driven substrate, drying the cast catalyst slurry on the substrate at temperatures between 50° C. to 200° C. for a period of time of about 0.1 hour to 1.0 hour to obtain dried catalyst particles, and removing the dried catalyst particles from the substrate.

The catalyst sample can be produced in an amount of about ca. 3 g to 300 g from slurries with volumes between 5 cc to 500 cc. The catalyst sample can be an FCC catalyst and can be produced in an amount suitable for high throughput experimentation and has a pore structure comparable to catalyst produced by spray drying.

The process and the sample produced thereby can be used in combination with a refining process.

These and other aspects of the invention will become apparent when taken in conjunction with the detailed description and appended drawings.

BRIEF DESCRIPTION OF THE DRAWINGS

The invention will now be described in conjunction with the accompanying drawings in which.

In the drawings, like reference numerals indicate corresponding parts in the different figures.

DETAILED DESCRIPTION OF PREFERRED EMBODIMENTS

Figure 1:
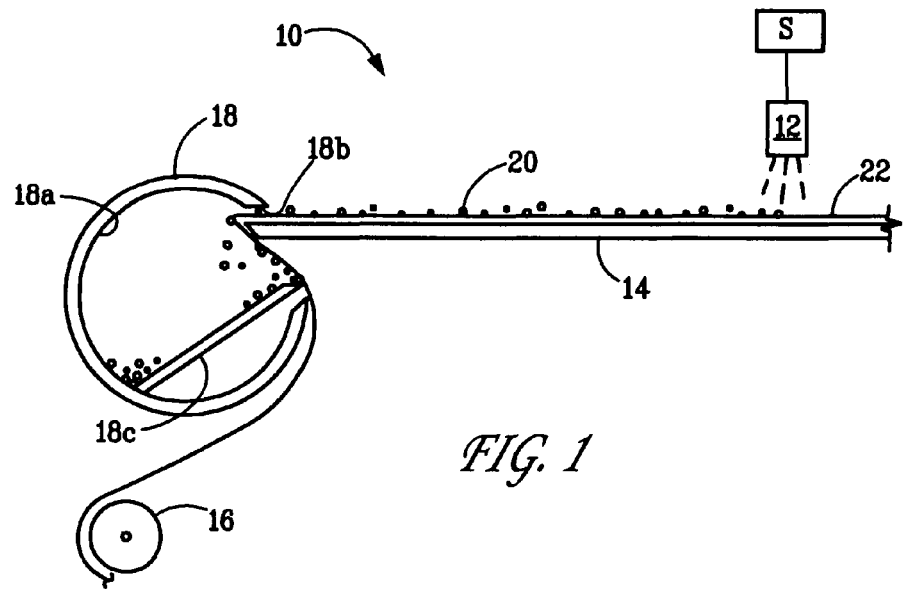
FIG. 1 is a schematic side view of a tape casting device in accordance with this invention for casting, drying and retrieving catalyst particles.

This invention is directed to a process and manufacturing device for the production of catalysts for experimentation on process variables, using HTE for example. According to this invention, it is also possible to control the composition of FCC catalysts that are sized so that the product produced is adequate for presently existing automated FCC reactors, until such time as a high throughput reactor is available.

A key element in this process is that the drying procedure has enough inherent control that a catalyst sample can be produced that simulates the behavior of equilibrated catalysts produced by steaming at lower steam partial pressures and temperatures, but for longer periods of time, in commercial units. The catalyst sample can be produced from slurries with very little volume, for instance as little as 30 cc of volume. For example, in accordance with this invention, the yield of catalyst from a 50 cc slurry of 40% solids is expected to be essentially quantitative, i.e. ca. 20 g, which after ion-exchange, calcination and steaming losses should still produce ca. 10 g of finished catalyst. This is sufficient for ACE (Advanced Cracking Evaluation) testing and SA/PV (surface area/pore volume) measurements. The drying procedure is tape casting, which has been known in the ceramics industry but has not traditionally been applied in catalyst manufacture.

Tape casting is a process whereby thin films (between about 40 microns and 1400 microns) typically of ceramics materials can be made from slurries whose viscosities vary between 10 and 30,000 cPs and whose solids contents are higher than 15%. This process has no inherent limitations on the temperature profile experienced by the material, since the material can be set on a bed over which the substrate passes and the gas composition can be controlled with appropriate gas feeds. The process has a level of control that makes process variable studies that are critical in actual commercial practice possible.

Using the process described herein, catalyst samples can be prepared for evaluation in existing small scale FCC reactors at a scale currently available for high throughput gel preparation (ca. 30 cc). In accordance with this invention, drying conditions have been identified as a key variable in the process since drying sets the matrix pore structure. It has been found that catalysts with comparable pore structure prepared in a spray drier and in a tape casting regime have comparable coke selectivities and gas selectivities that are consistent within a given preparation procedure.

The primary advantage that this approach has over conventional FCC catalyst research is that it is not limited by the number of experiments that can be run through a spray drier and offers process control that does not exist in typical spray driers. A second advantage over some other HTE approaches is that the focus of this process is on the finished catalyst, eliminating many of the real, substantial issues associated with incorporation of materials into catalysts.

According to this invention, a tape casting device is used to cast a catalyst slurry onto a substrate. The catalyst slurry is preferably an FCC catalyst, which is comprised of zeolites, matrix components such as aluminum oxides, aluminum oxyhydroxides and aluminum hydrates, and binder. Various known tape casting devices are suitable for use with this invention.

Figure 2:
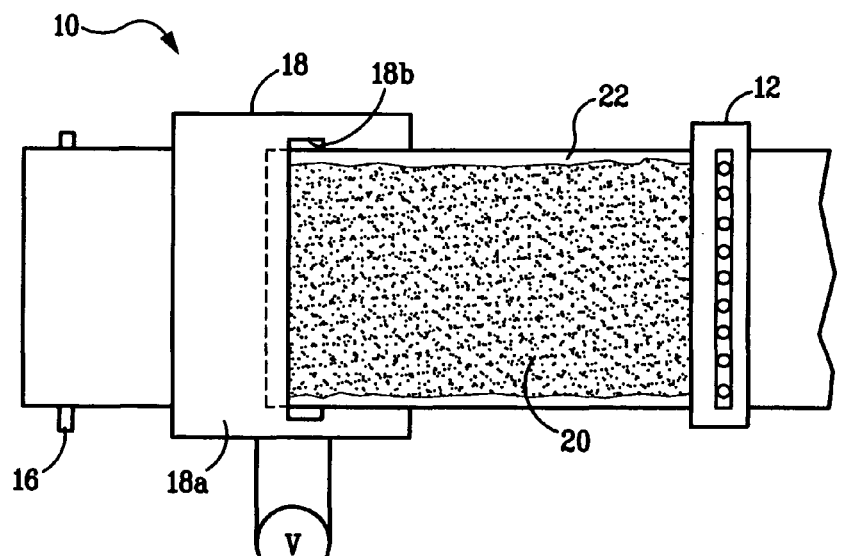
FIG. 2 is top view of the tape casting device of FIG. 1.

An example of a suitable device is shown schematically in FIGS. 1 and 2. The tape casting assembly 10 includes a tape casting device including a dispenser 12, which can be a print head, sprayer and doctor blade, or other known applicator. The dispenser 12 dispenses a thin layer of catalyst slurry with a regulated thickness, as is known. The print head 12 is connected to a slurry supply S and is disposed adjacent to a substrate support or positioning plate 14. The assembly 10 also includes a take up roller 16 and a particle collection device 18, both disposed downstream of the positioning plate 14.

The device 10 operates as follows. The catalyst slurry 20 is cast onto a substrate 22 supported on the positioning plate 14. The substrate 22 can be an endless tape loop or other known suitable substrate. For example, a flat polyester tape can be used. After the catalyst slurry has dried, as described in the process below, the substrate 22 is fed to the particle collection device 18, which is a vacuum collection device including a housing 18a having a slot 18b through which the substrate 22 enters and exits the device and a scraper blade 18c disposed within the housing 18a. The scraper blade 18c is positioned so that the substrate 22 passes against the edge. By this, particles 20 are scraped from the substrate 22 by the blade 18c and collected in the housing 18a. The positioning plate 14 extends within the slot 18b, as seen in FIG. 1, so that the substrate 22 is fed into the housing 18a and around the blade 18c before exiting the housing 18a to be wound around the take up roller 16 or fed downstream to repeat the process. A vacuum V is applied to the housing 18a so that the particles 20 are drawn from the substrate 22. Some particles 20 may become free from the substrate 22 when the substrate is turned over the edge of the positioning plate 14, and the remaining particles 20 will be scraped from the substrate 22 by the scraper blade 18c. The particles 20 can then be collected.

The drying process that occurs after the catalyst slurry 20 is cast onto the substrate 22 prior to removal by the particle collection device 18 operates as follows. The cast slurry 20 is dried prior to ion exchange and calcination by heating within a temperature range of 50° C. to 200° C. for 0.1 to 1 hour. Preferably, the temperature is set at 120° C. for a period of 0.2 to 1 hours. This dried material can then be calcined to "set" the structure, if necessary. The particles can be calcined at temperatures between about 400° C. and 800° C. for one hour. The dried catalyst particles are then ion exchanged, as known. The calcined catalyst particles can then be steamed at temperatures of about 760° C. to 830° C. for periods between 6 hours and 16 hours. Intermediate calcinations, ion-exchange, and drying can be effected as needed prior to removal from the substrate.

Figure 3:
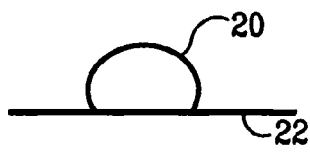
FIG. 3 is a schematic view of a slurry drop on a non-wetting substrate showing a high contact angle.
Figure 4:
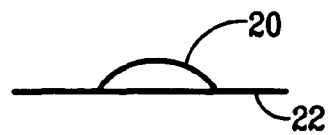
FIG. 4 is a schematic view of slurry drop on a wetting substrate showing a low contact angle.

Recognizing that the degree of wetting of the surface is critical for successful implementation of this approach, the substrate 22 upon which the catalyst slurry 20 is cast can first be treated with a surface active agent forming a film leading to either wetting or non-wetting behavior. For instance, polyoxoethylene substantially increases the wettability of polyethylene by the catalyst slurry, which leads to smaller particles. Thus, a slurry 20 with a high contact angle between the slurry 20 and the film on the substrate 22 will produce fat catalysts particles upon drying, as illustrated in FIG. 3. A slurry 20 with a low contact angle between the slurry 20 and the film on the substrate 22 will produce thin catalyst particles upon drying, as illustrated in FIG. 4.

A number of strategies can be employed using the wettability of the substrate 22 by the catalyst 20 to control the ultimate particle size of the catalyst particles, e.g. a wettable substrate with a non-wettable coating to "form" the wetted portion, a non-wettable substrate with a wetting agent to allow catalyst adhesion and shaping, and printing of a wetting or non-wetting agent printed on the substrate 22 prior to casting the catalyst slurry 20.

Preferably, in accordance with this process, a water-wetting agent, such as polyvinylalcohol is used when casting at lower temperatures. At higher temperatures, such as at 120° C., carboxylmethylcellulose is used to cause the catalyst slurry to adhere and form fine threads of dried catalyst. These threads can then be scraped off of the substrate 22 in the particle collection device 18 and vacuumed into a thimble.

Other substrate configurations are possible. For example, the substrate 22 itself can be non-wettable but carry with it a mesh 24 (seen in FIGS. 5A and 5B) made with polymers such as polypropylene, cellulose, rayon, polyester, or nylon. As discussed below, this material 24 can be burned off after soaking up the catalyst precursor thus instantly providing materials sized for the FCC application.

This is tested with the addition of zeolite, such as MCM-68, to a binder, such as Ludox HS-40, in the presence of concentrated ammonium hydroxide to facilitate dispersion of the zeolite in the binder followed by neutralization of the ammonia with acetic acid to "gel" the binder, squeegeeing onto a polypropylene mesh and calcining in an oven at 550° C. for ca. 30 minutes to give a finely meshed material in as high as 80% yield which is suitable for evaluation in the ACE unit. The sized material for three separate preparations has pore size distributions consistent with the reaction of the zeolite with the binder material. It is also contemplated that the substrate be a non-wettable surface and that the mesh be made of wettable polymers, such as polyester and nylon.

It is also possible to use polymers, such as Teflon, silicones and polymer composites with reinforcing material such as glass, carbon, or metal to manufacture continuous loop tapes as the substrate 22. An example of such a material is that used for non-stick flexible molds and pans introduced by Demarle called Flexipan®. With Flexipan®, the non stick flexible molds and trays will unmold without greasing, resist breakage, unmold when frozen, offer a long life, and wash with a hot water soak and rinse. Flexipan® is made with a combination of fiberglass and silicone and can be used at temperatures varying from −40° C. to 280° C.

Figure 5A:
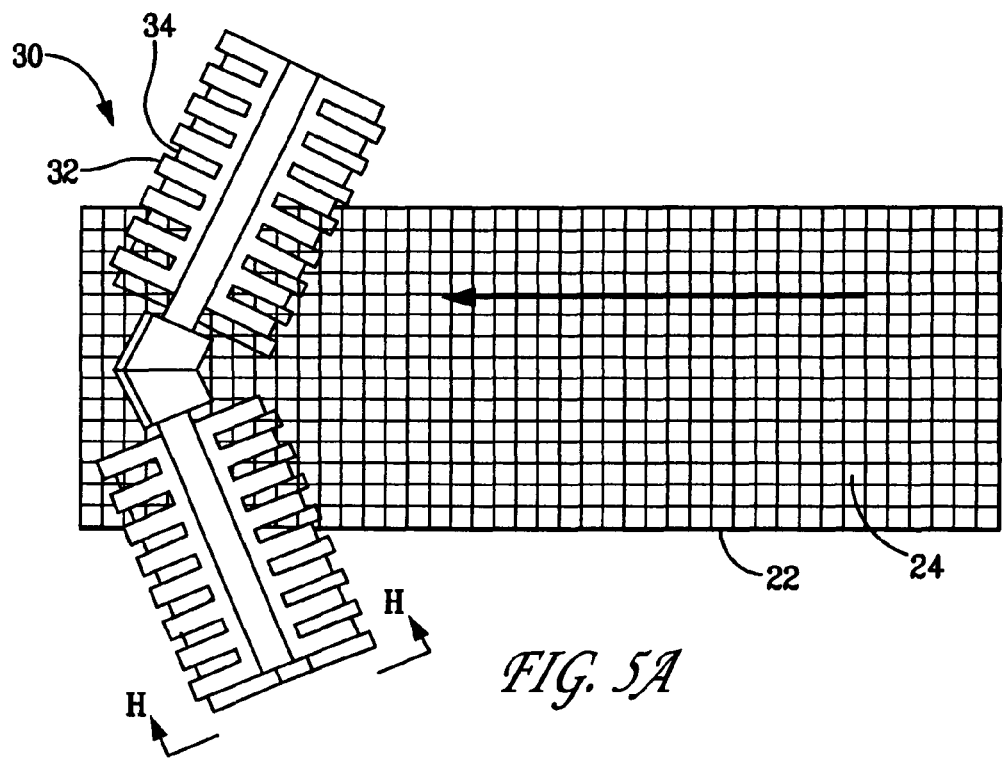
FIG. 5A is top view of another device in accordance with the invention for removing dried catalyst from a mesh.
Figure 5B:
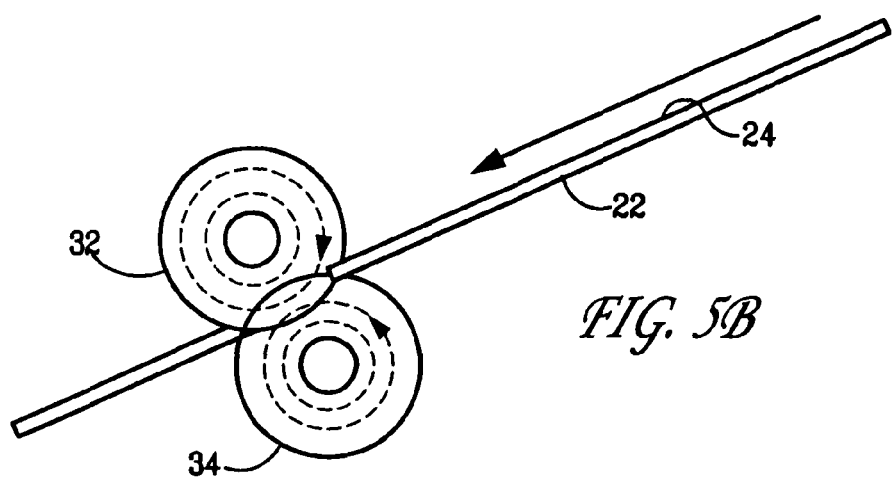
FIG. 5B is a side view of the device of FIG. 5A taken along line I-I.

There are several alternative methods for removing the catalyst particles 20 from a substrate 22 with a mesh 24 after drying. In one approach, the mesh 24 is actually burned out from around the catalyst. This procedure is straightforward if the catalyst is not adversely affected by the temperature or the decomposition products on calcination. In the other approach, the catalyst is removed from the mesh 24 by stretching or moving the mesh 24 in a number of orientations to dislodge the dried particles. An illustration of such an oriented dislodging device 30 is seen in FIGS. 5A and 5B. The device 30 feeds the substrate 22 and the mesh 24 toward intermeshed rotating nips 32, 34 that are driven by a driver (not shown). The nips 32, 34 engage the substrate 22 and the mesh 24 and cause it to move in different directions in three dimensions to dislodge dried bits of catalyst.

Using the above described tape casting and drying process, catalyst samples can be produced in an amount of about ca. 3 g to 300 g from slurries with volumes between 5 cc to 500 cc. This production amount provides catalyst samples that simulate the behavior of equilibrated catalysts produced in known commercial units that have been steamed at lower steam partial pressures and temperatures for longer periods of time. Since the catalyst samples in accordance with this invention can be produced from slurries of about 30 cc for example, and with as little as 5 cc, a sample amount can be provided that is suitable for high throughput experimentation with a pore structure comparable to catalysts produced by conventional spray drying techniques.

Through experimentation, the inventors are able to compare catalysts manufactured using tape casting to dry the particles with catalysts manufactured using spray drying. The formulations are dried and then ion-exchanged with ammonium sulfate and calcined to make the finished catalysts. It is seen that the manner of drying is as important to the finished catalyst as the slurry composition. Further, the manner of drying has a large impact on the porosity of the materials obtained. One of the parameters that most strongly affects the pore size diameter (PSD) is the drying temperature (spray dried catalysts experience a very high initial temperature difference between the particle and the drying medium, while tape-cast/pan-dried catalysts show a much smaller difference.) A second identifiable variable is the order of addition of the components of the slurry. It is found that catalysts produced with tape casting and catalysts produced with spray drying have pore size distributions that are quite similar, even when they are made on a vastly different scale. It is also seen that catalysts with comparable pore structures, regardless of the method of preparation, have comparable coke selectivity.

Given the importance of the drying procedure, it is within the purview of this invention that exotic drying techniques such as microwave drying, focused elliptical infrared drying, as well as more conventional radiant heat drying are all viable drying techniques for use in this invention.

Various modifications can be made in this invention as described herein, and many different embodiments of the device and method can be made while remaining within the spirit and scope of the invention as defined in the claims without departing from such spirit and scope. It is intended that all matter contained in the accompanying specification shall be interpreted as illustrative only and not in a limiting sense.

What is claimed is:

1. A process for producing a fluid catalytic cracking catalyst sample, comprising:
   casting a catalyst slurry onto a driven substrate, on which substrate is provided a wettable polymer mesh;
   drying the cast catalyst slurry on the substrate and mesh at temperatures between 50° C. to 200° C. for a period of time of about 0.1 hour to 1.0 hour to obtain dried catalyst particles; and
   removing the dried catalyst particles from the substrate and mesh either by moving the substrate and mesh in multiple directions to dislodge the dried catalyst particles or by burning the mesh.

2. The process of claim 1, wherein the cast catalyst slurry is dried at about 120° C. for a period of 0.2 hours to 1.0 hour.

3. The process of claim 1, wherein the catalyst sample is produced in an amount of about 3 g to 300 g from slurries with volumes between 5 cc to 500 cc.

4. The process of claim 1, further comprising after the catalyst particles are dried:
   calcining the dried catalyst particles having a catalyst pore structure at temperatures between 400° C. to 800° C. for 1 hour to obtain a calcined catalyst;
   steaming the calcined catalyst at temperatures between 760° C. to 830° C. for a period of between 6 hours and 16 hours.

5. The process of claim 4, wherein the catalyst pore structure prior to calcining is in a range of 10-40 Angstroms.

6. The process of claim 1, wherein the catalyst sample is produced in an amount suitable for high throughput experimentation and has a pore structure comparable to catalyst produced by spray drying.

7. The process of claim 1, wherein the substrate comprises polyester, polymer, silicone or polymer composite.

8. The process of claim 1, wherein the substrate is a combination of fiberglass and silicone.

9. The process of claim 1, further comprising adding carboxylmethylcellulose to the catalyst slurry.

10. The process of claim 1, wherein the catalyst slurry comprises zeolite and binder.

11. The process of claim 1, in combination with a refining process.

* * * * *